July 8, 1969  L. H. CONRY  3,453,670
MARINE BUOY
Filed June 30, 1967  Sheet 2 of 2
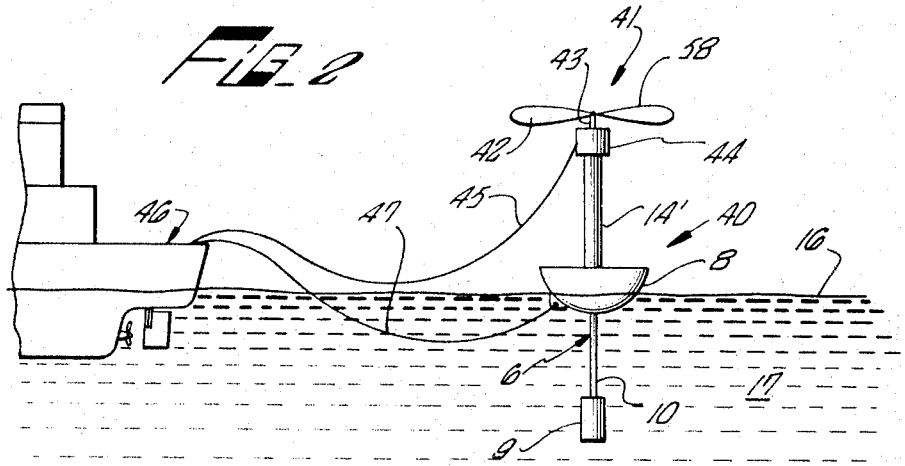
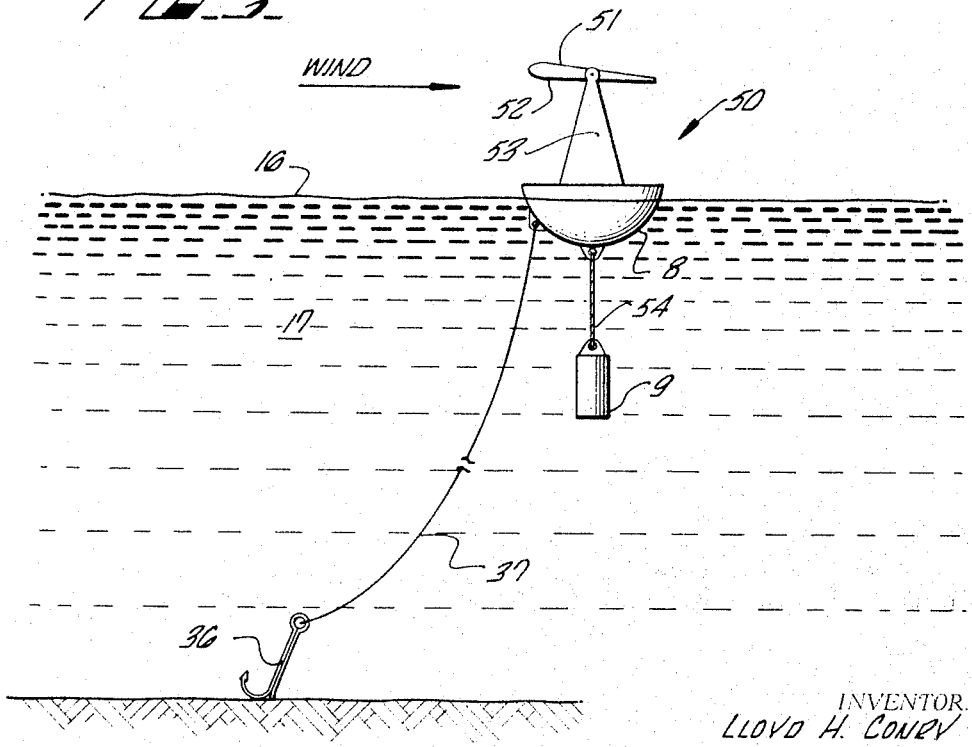
INVENTOR.
LLOYD H. CONRY
BY
Christie, Parker & Hale
ATTORNEYS

United States Patent Office 3,453,670
Patented July 8, 1969

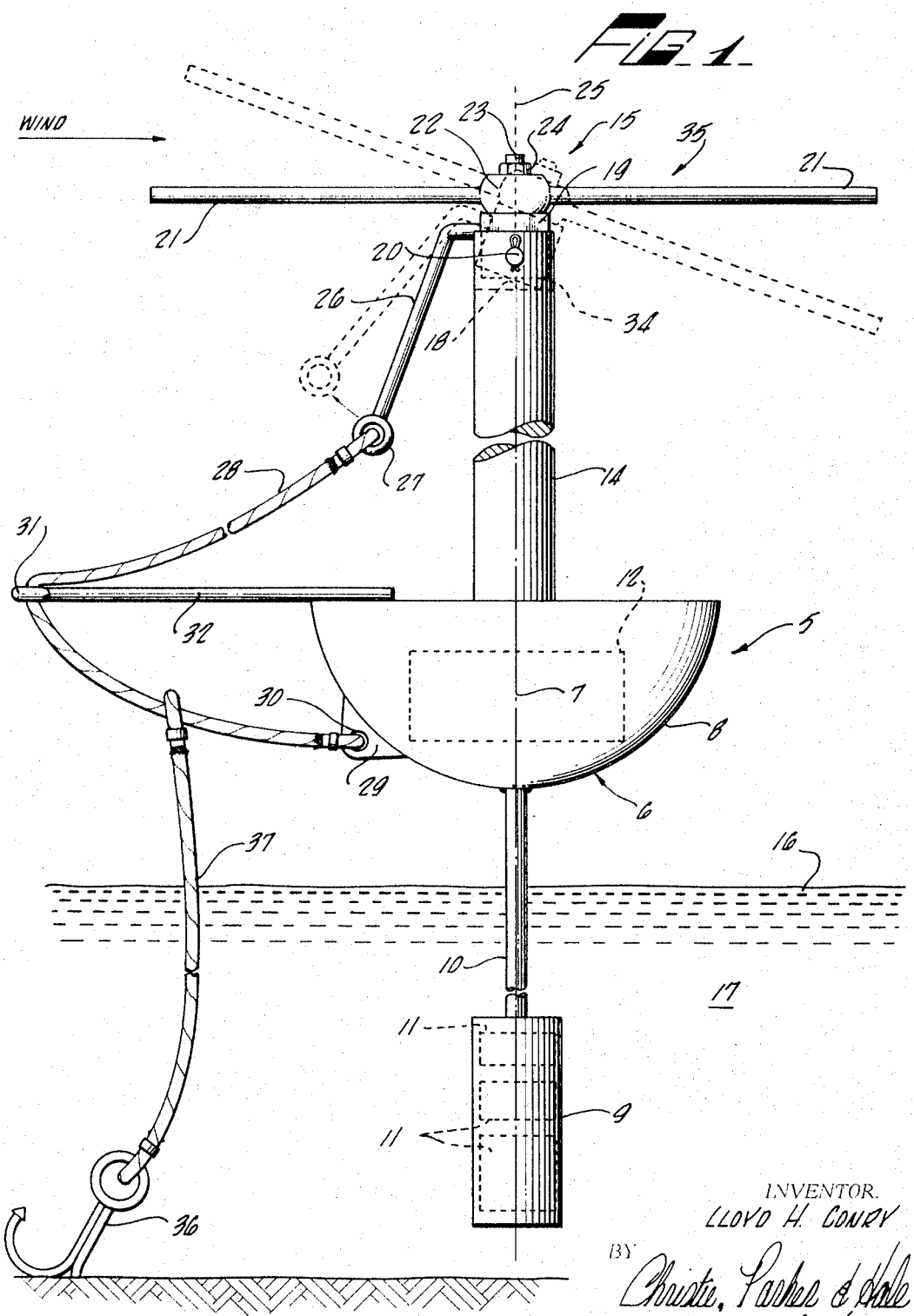

3,453,670
MARINE BUOY
Lloyd H. Conry, Whittier, Calif., assignor to Global Marine Inc., Los Angeles, Calif., a corporation of Delaware
Filed June 30, 1967, Ser. No. 650,406
Int. Cl. B63b *21/52, 51/02;* B64c *27/00*
U.S. Cl. 9—8                                    4 Claims

ABSTRACT OF THE DISCLOSURE

A marine buoy having an airfoil device mounted to its buoyant portion to lift the body from the surface of a body of water. The airfoil device may operate in response to a relative wind past the buoy, or it may be power driven.

BACKGROUND OF THE INVENTION

Field of the invention

This invention relates to marine buoys, and more particularly to a marine buoy to which is fitted an airfoil device for lifting the buoy from the surface of a body of water, preferably in response to relative winds past the buoy.

Description of the prior art

In instrumenting oceanographic surveys, it is frequently necessary to leave measuring instruments at a particular location in the ocean over extended periods of time, as when temperature measurements, measurements of currents, wave measurements or sonar experiments, for example, are being performed. The appropriate measuring instruments are floated at a particular desired location of the ocean and may continuously record data. After some time the data is collected for subsequent analysis. Alternatively, the instruments may be located on a buoy provided with a telemetering transmitter, in which case the data is transmitted to a remote analysis location as it is gathered by the instruments.

The instrumentation utilized in oceanographic surveys is frequently extremely sensitive and delicate. Severe accelerative forces occasioned by heavy seas and accompanying strong winds often are imposed on these instruments and their supporting electric circuitry, and may produce damage therein.

In the past, oceanographic survey instrumentation was installed in floating buoys which were at all times exposed to wave action. Aside from the damage that such action may produce in the instruments themselves, the buoy and the instruments experience severe heaving and rolling motion which, if of sufficient amplitude, can cause the readings recorded by the instruments to be inaccurate or false. To secure the buoy to an anchor does not overcome this difficulty with conventional buoys since anchoring the buoy only constrains the buoy to a particular general location in the ocean and does not significantly reduce wave-related motions of the buoy.

SUMMARY OF THE INVENTION

This invention provides a buoy which normally floats on the surface of the sea, but which is lifted from the sea in heavy winds by the action of the wind upon an airfoil device mounted to the buoy. When the buoy is used as an instrument platform, readings taken by the instruments are obtained with the greatest possible accuracy, and damage to the instruments from the above-mentioned wave-related accelerative forces is minimized.

As long as the winds moving over the surface of the sea are relatively weak, the buoy floats on the sea surface. Increasing winds act on the airfoil device to produce a lifting force upon the structure of the buoy. If the lifting force developed by the airfoil device is insufficient to actually lift the buoy from the water surface, such force acts to reduce rolling and pitching of the buoy. Winds of greater magnitude develop sufficient lifting force on the buoy to bodily lift the buoy from the ocean surface and thereby completely remove the buoy from the action of passing waves. If the buoy should be raised above the sea surface and the wind passing the buoy should suddenly decrease in velocity, the airfoil device functions to lower the buoy gently back to the ocean surface. In addition, the buoy can be provided with a motor to energize a rotary wing airfoil device to lift the buoy above the water surface independently of any wind which may be passing the buoy.

Generally speaking, this invention provides a marine buoy which includes a buoyant body having a flotation portion. An airfoil device is mounted to an upper portion of the buoy body and is responsive to relative wind past the airfoil device for developing a vertical force tending to lift the buoy body from the surface of the sea. The buoy also includes means connected to the body for operating the airfoil device.

BRIEF DESCRIPTION OF THE DRAWINGS

The above-mentioned and other features of this invention are more fully set forth in the following detailed description of preferred embodiments of the invention, which description is presented with reference to the accompanying drawings, wherein:

FIG. 1 is a side elevation view of a marine buoy according to this invention;

FIG. 2 is a schematic view of a buoy secured to a vessel for towing thereby; and FIG. 3 is a side elevation view of a buoy incorporating a fixed airfoil device.

DESCRIPTION OF THE PREFERRED EMBODIMENTS

As shown in FIG. 1, a marine buoy 5 includes a buoyant body 6 having a vertical axis of symmetry 7. The buoy body includes a principal flotation portion 8 below which is located an instrument container 9 connected to the flotation portion by an elongate, hollow connecting tube 10. Suitable oceanographic instruments 11 are located within the container. Signals developed by the instruments are applied to recording devices 12 located in the body flotation portion via suitable conductors (not shown) passed through the connecting tube. The buoy body, comprised of portions 8, 9 and 10, has net positive buoyancy.

A supporting mast 14 for an airfoil device 15 extends sufficiently far upwardly from the buoy flotation portion along axis 7 that the airfoil device is located a desired distance above the surface 16 of a body of water 17 upon which the buoy may be floating. The center of gravity of the buoy structure is below its center of buoyancy so that the buoy tends to float with axis 7 disposed vertically.

As shown in FIG. 1, the upper end of mast 14 is bifurcated by an upwardly open transverse recess having a bottom 18. A support block 19 for an airfoil device 35 is pivotally mounted between the mast bifurcations on a support pin 20 for pivotal movement relative to the mast about an axis normal to axis 7. The airfoil device is of the rotary blade type and includes a plurality of airfoil blades 21 which extend radially from a central hub 22. The hub is rotatably mounted to a shaft 23 which extends upwardly from block 19 along axis 25, the hub being secured from axial movement along the shaft by a nut 24 or the like engaged with the shaft.

A control arm 26 for the airfoil device is fixed to block 19 and extends laterally from axis 25 between the mast bifurcations 14 and downwardly at an angle to axis 25 to an eye 27 at its lower end. A control lanyard 28 is engaged at one end thereof with eye 27 and is engaged at its other end to body flotation portion 8 via an eye 30 by means in a lug 29 secured to the buoy. The central portion of the control lanyard is passed through an eye 31 located at the outer end of a spreader arm 32 which is secured to the buoy body and extends radially from axis 7. The point of connection of arm 26 to block 19, eyes 27 and 31, and axis 7 all lie in a common plane.

The geometry of spreader arm 32 and of control arm 26 is selected so that, when the axis of rotation of rotor 35 is collinear with buoy axis 7, eye 27 is located inwardly toward axis 7 from a straight line between eye 31 and the point of connection of control arm 26 to block 19. Also, the point of connection of the control arm to block 19 is above pin 20.

The pivotal movement of block 19 about pin 20 is limited by the engagement of the lower corners 34 of block 19 with the base of the recess between the bifurcations of mast 14.

The normal position of rotor 35, as shown in solid lines in FIG. 1, is that in which the rotor axis is collinear with the buoy axis of symmetry. The length of control lanyard 28 is selected such that, when the rotor is in its normal position, the lanyard is slack between eyes 27 and 30. The lanyard is free to slide through eye 31 of spreader arm 32.

Buoy 5 is constructed for unattended operation on the sea. Accordingly, the buoy is secured at a desired location in the sea by an anchor 36 engaged with the sea bottom and connected to the buoy via a cable or chain mooring line 37. The upper end of the mooring line is connected to the control lanyard between eyes 30 and 31, preferably in such a manner that the upper end of the mooring line is free to slide along the control lanyard but cannot become disengaged from the control lanyard.

As indicated above, when little or no wind moves past the buoy, the buoy normally floats vertically on sea surface 16. In such condition, the rotor axis is collinear with the buoy axis. Where the relative wind past the buoy is ten miles per hour or less, such winds generally being associated with seas of five feet or less, the tension on mooring line 37, as applied to the control lanyard, is insufficient to move the lower end of control arm 26 appreciably away from buoy axis 7.

If the wind past the buoy is in the range of from ten to twenty miles an hour, such winds generally being associated with five to ten foot seas, the drift of the buoy laterally from anchor 36 is sufficient to produce enough tension in the mooring line to move the control arm from the position shown in solid lines in FIG. 1 toward the position shown in dashed lines. Thus, as the rotor axis of rotation is moved out of collinearity with axis 7, at least some of rotor blades 21 have an angle of attack relative to the wind moving past the buoy. As a result, the rotor begins to rotate about axis 25 and develops a vertical lifting force which is imposed upon the buoy. This lifting force is insufficient to cause the buoy to be lifted from sea surface 16, but it is sufficient to impart a stabilizing force to the buoy which acts to counteract the rolling and pitching which the buoy encounters in seas associated with winds of this velocity.

If the wind velocity past the buoy is in the range of from twenty to forty miles per hour, the lifting force developed by the windmilling rotor upon the buoy is sufficient to cause at least the buoy flotation portion to be lifted from the sea surface an amount sufficient to place the major portion of the buoy structure above the crests of passing waves. Connecting tube 10, however, preferably is of sufficient length that instrumentation container 9 is still submerged within the ocean so that instruments 11 continue to monitor the status or variation of desired physical phenomena within the ocean. With the buoy raised above the ocean surface, as shown in FIG. 1, the instruments and supporting equipment contained within the buoy are essentially free of accelerative loads since the buoy itself is essentially free of the effects of passing waves.

Stronger winds than those mentioned above operate on the buoy to lift the buoy entirely clear of ocean 17.

The extent to which the buoy is lifted above the ocean surface is dependent upon the strength of the wind passing the buoy. The lateral force imposed by the wind upon the buoy determines the tension developed in mooring line 37, such tension at the buoy having a vertical component which increases as the buoy moves laterally along and vertically above the ocean surface. Also, the effective weight of the buoy varies with the extent to which it is immersed in the sea. Accordingly, for any given wind condition, there is a balance of vertical forces acting on the buoy and the buoy seeks a condition of elevation in which the vertical forces acting on the buoy are balanced.

In the event that the wind velocity past the buoy should drop suddenly, the airfoil device acts to return the buoy slowly and gently to the ocean surface. As a result, the instruments and electronic equipment carried by the buoy are not subjected to sudden shocks as the buoy falls sharply back to the ocean surface.

FIG. 2 illustrates another buoy 40 which has the same basic body structure of buoy 5, described above. Buoy 40, however, includes a self-propelled airfoil device 41 composed of an airfoil-bladed rotor 42 mounted to a shaft 43 of a drive motor 44 fixed to the upper end of mast 14'. Preferably, the motor is an electric motor to which power is applied through a suitable electric cable 45 connected between the buoy and a tow vessel 46. The buoy is connected to the vessel by a towing cable 47; if desired, the electrical conductors to the motor can be incorporated into the towing cable.

Buoy 40 is particularly useful in carrying out oceanographic surveys of the type where it is desired that the instruments be moved in a predetermined manner through the ocean by a research vessel or the like, but it is also desired that the instruments be located sufficiently far behind the vessel that the effects of the vessel's movement through the ocean are not presented to the instruments mounted to the buoy. The motor of buoy 40 can be operated at any one of a selected number of rates to provide varying magnitudes of lifting and stabilizing forces on the buoy. Thus, if research is being carried out in a relatively calm sea, motor 44 is operated to drive the rotor only sufficiently to impose upon the buoy the sufficient stabilizing force to override the effects of the wake of the vessel on the buoy itself. If, however, the ship is running through moderate or heavy seas and it is desired to continue the oceanographic survey, motor 44 is operated to drive the rotor at a rate adequate to produce sufficient lifting force on the buoy to lift the principal portion of the buoy from the ocean surface. It is apparent, therefore, that the structure shown in FIG. 2 provides a stable instrumentation platform regardless of the condition of the sea in which it is used.

FIG. 3 illustrates another buoy 50 which incorporates a fixed wing 51 having a lifting airfoil configuration with a leading edge 52. The wing is supported above the buoy flotation structure by a support structure 53. In buoy 50, instrumentation container 9 is suspended below the buoy flotation portion by a cable 54 which may also incorporate the conductors connecting the instruments to such supporting electronic equipment as may be present in the upper portion of the buoy body. Mooring line 37 is connected directly to the buoy structure, as shown.

In buoys 5 and 50, proper orientation of the airfoil device relative to wind moving past the buoy is assured by the manner in which mooring line 37 is connected to the buoy. In the case of buoy 5, the spreader arm and the control arm are always disposed on that side of the buoy which is toward the wind since the buoy tends to drift with the wind, and the drag of the mooring line acts to keep the spreader arm pointed into the wind. In the case of buoy 50, the connection of mooring line 37 to the buoy is on that side of the buoy which is below the leading edge of wing 51.

It will be apparent that the buoy structures described above may be provided with either data acquisition and storage equipment in the structure of the buoy, or that the supporting equipment for the instruments may include a telemetering system, including a transmitting antenna, not shown. In the case of buoy 40, it is preferred that the information gathered by the buoy-mounted instruments be supplied directly to the oceanographic vessel through conductors which preferably are incorporated into towing cable 47.

From the foregoing description, it is apparent that this invention provides a novel marine buoy which is particularly suited for use with oceanographic instrumentation and surveying. The buoy provides a stable instrumentation platform which is essentially insensitive to the condition of the sea. As a result, the buoy provides protection for expensive and delicate oceanographic instruments and, because the instruments operate on a stable platform, the accuracy of data obtained by such instruments is improved.

What is claimed is:

1. A marine buoy comprising a buoyant body including a floatation portion, a radially bladed rotor, a supporting mast for the rotor extending upwardly from the body floatation portion and mounting the rotor at an upper end thereof for rotation of the rotor about a rotor axis, a support shaft for the rotor defining the rotor axis, means mounting the shaft to the upper end of the mast for limited pivotal movement of the shaft relative to the mast about a pivot axis normal to the rotor axis, and means connected to the shaft responsive to wind past the buoy for moving the shaft angularly about the pivot axis in a direction sufficient to place the edge of the rotor toward the wind above the edge of the rotor located away from the wind.

2. A buoy according to claim 1 wherein the means for moving the shaft includes a mooring line for the buoy.

3. A marine buoy comprising a buoyant body including a floatation portion, a radially bladed rotor, a supporting mast for the rotor extending upwardly from the body floatation portion and mounting the rotor at an upper end thereof for rotation of the rotor about a rotor axis, a rotor support member defining the rotor axis, means mounting the rotor support member to the upper end of the mast for angular movement relative to the mast about a pivot axis normal to said rotor axis, a control arm fixed to the support member above the support member pivot axis and extending laterally and downwardly therefrom to a lower end spaced from the mast, the support member having a normal position in which the rotor axis is substantially vertical, an elongated flexible member connected between the lower end of the control arm and the buoy body, and spacer means loosely engaging an intermediate portion of the flexible member and spacing the same an amount laterally of the mast sufficient that the lower end of the control arm in the normal position of the support member is located toward the mast from a line between the connection of the control arm to the mast and the point of engagement of the spacer means with the flexible member.

4. A buoy according to claim 3 including an anchor, and a mooring line connected between the anchor and the flexible member at a location along the flexible member between the spacer means and the buoy body.

References Cited

UNITED STATES PATENTS

| | | | |
|---|---|---|---|
| 1,825,363 | 9/1931 | Robertson | 114—66.5 |
| 1,928,552 | 9/1933 | Band. | |
| 2,494,445 | 1/1950 | Moeller | 9—8 X |
| 2,642,239 | 6/1953 | Crossley | 244—105 |
| 2,956,532 | 10/1960 | James et al. | 114—235 |
| 2,995,740 | 8/1961 | Shreckengost | 244—17.17 X |
| 3,030,050 | 4/1962 | Hagemann | 244—3 |
| 3,053,481 | 9/1962 | Wyatt | 244—17.17 |
| 3,272,457 | 9/1966 | MacMillan | 244—3 X |

OTHER REFERENCES

Publication: Reprint from the International Hydrographic Review, vol. XL, No. 2, July 1963, pp. 47 and 48.

Life Magazine, vol. 41, No. 4, July 23, 1956, p. 67.

MILTON BUCHLER, *Primary Examiner.*

JEFFREY L. FORMAN, *Assistant Examiner.*

U.S. Cl. X.R.

114—235; 244—17.17, 105